J. L. FIRM.

PRINTING-PRESS.

No. 7,224. Reissued July 18, 1876.

Witnesses.
John Becker
Jno Haynes

Joseph L. Firm
by his Attorneys
Brown & Allen

UNITED STATES PATENT OFFICE.

JOSEPH L. FIRM, OF NEW YORK, N. Y., ASSIGNOR OF ONE-HALF INTEREST TO CALVERT B. COTTRELL AND NATHAN BABCOCK, OF WESTERLY, R. I.

IMPROVEMENT IN PRINTING-PRESSES.

Specification forming part of Letters Patent No. 169,795, dated November 9, 1875; reissue No. 7,224, dated July 18, 1876; application filed December 31, 1875.

*To all whom it may concern:*

Be it known that I, JOSEPH L. FIRM, of the city, county, and State of New York, have invented a new and useful Improvement in Printing-Presses; and I do hereby declare that the following is a full, clear, and exact description of the same, reference being had to the accompanying drawing, forming part of this specification.

This invention more particularly relates to the class of "perfecting-presses" in which the paper is fed from a continuous web or roll and is printed on both sides at one operation.

The invention consists in a certain combination or system of two pairs of cylinders or rollers, each composed of one form-cylinder and one impression-cylinder, and an interposed series of cylinders or rollers, composed of one form-cylinder and two impression-cylinders, in all making seven cylinders or rollers, arranged to print on both sides of separate continuous webs or rolls of paper, whereby not only power and space are economized and the amount of surface-travel of the cylinders is reduced, but also endless blankets for the impression-cylinders, operating also as conveyers of the paper from one series of cylinders to another, are dispensed with, and the soiling of the webs of paper by ink transferred to the blankets is avoided.

Figure 1:
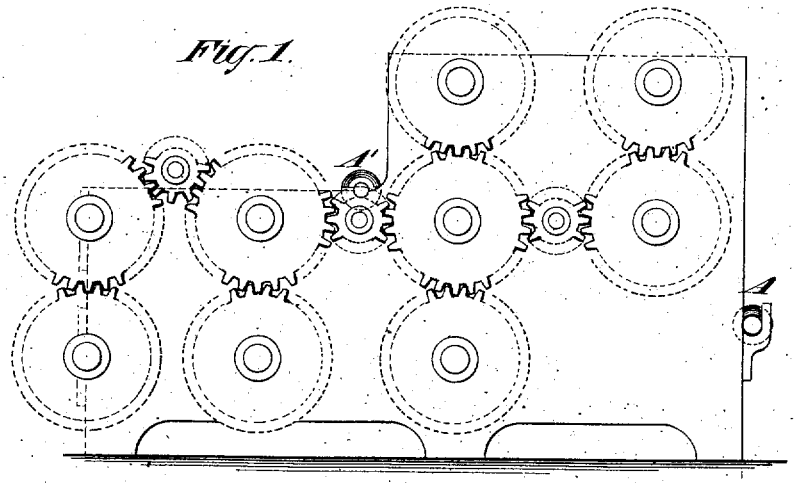
Figure 2:
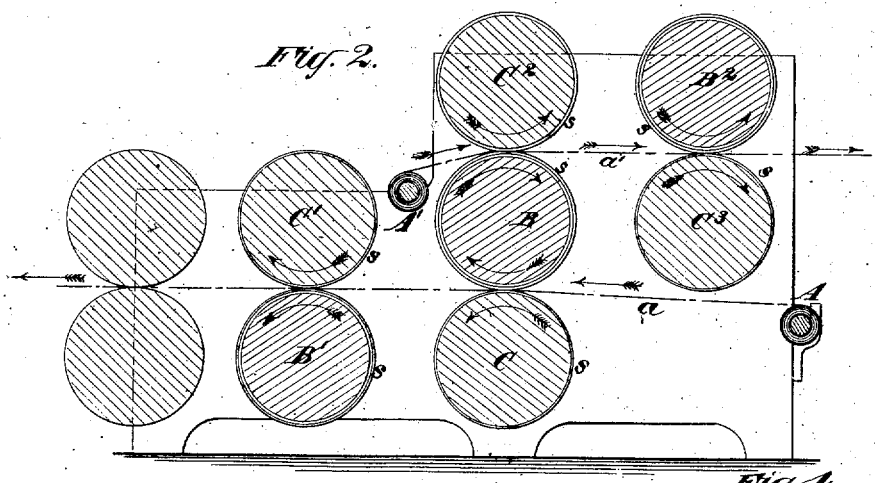
Figure 3:
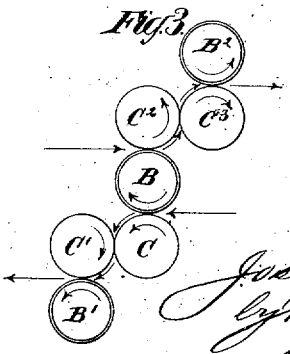
Figure 4:
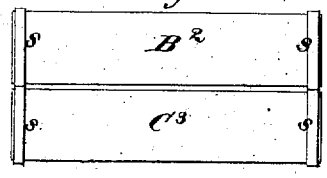

Figure 1 represents a side elevation of a perfecting-press, in part, having my invention applied; and Fig. 2, a vertical section of the same in a plane parallel with Fig. 1. Fig. 3 is a diagram in illustration of a modified arrangement of the form and impression cylinders. Fig. 4 is a longitudinal view of one of the form-cylinders and one of the impression-cylinders, with bands on their surfaces to keep them in contact.

The inking and other working devices of the press not necessary to illustrate the operation of my system of form and impression cylinders are omitted in the drawing, as also the devices for cutting the printed webs into suitable lengths.

A and A′, in Figs. 1 and 2, are the paper-rolls, from which the two rolls or continuous webs of paper *a a′* are fed, as indicated in Fig. 2 of the drawing. B, $B^1$, and $B^2$ are the form-cylinders of the press, and C, $C^1$, $C^2$, and $C^3$ are the impression-cylinders thereof. The web of paper *a* passes from the roll A over the impression-cylinder C and under the form-cylinder B, to effect the printing on its one side or surface, and from thence passes over the form-cylinder $B^1$ and under the impression-cylinder $C^1$, to print the other side or surface of such sheet. The other web of paper, *a′*, passes from the roll A′, under the impression-cylinder $C^2$, and over the form-cylinder B, to print its one side or surface, and from thence under the form-cylinder $B^2$ and over the impression-cylinder $C^3$, to print its opposite side or surface By these combinations of devices two important results are obtained, namely: first, the one form-cylinder B, or single form thereon, and the two impression-cylinders C $C^2$, serve to print the one side of two independent webs, *a a′*, as the same are passed or drawn from their respective rolls A A′, which thing of itself is not claimed as new; and, secondly, the two independent webs *a a′* are printed on both sides by means of only three form-cylinders and four impression-cylinders, thus enabling the press to accomplish as much work in a given time as two ordinary perfecting-presses, and whereby weight, first cost, working power, and space are economized, and the amount of surface-travel of the cylinders may be reduced one-eighth as compared with two presses employing four form-cylinders and four impression-cylinders, and endless blankets for the impression-cylinders, acting also as conveyers of the paper from one series of cylinders to another, as in other arrangements for printing on both sides of independent webs, are dispensed with, thereby doing away with the soiling or smearing of the one web by ink taken from the other web. In the double perfecting-press, also, which is the subject of this specification, there is the further advantage, when the same is employed for newspaper-work, of requiring only one stereotype form on the cylinder B for the "last side," instead of duplicate forms thereof on separate cylinders, thus saving time, labor, and expense.

Fig. 3 of the drawing shows substantially the same combination or system of form and impression cylinders as in Figs. 1 and 2, similar letters indicating like parts; but in Fig. 3 said cylinders are arranged so that they may directly gear with one another instead of employing intermediate gearing, as shown in Fig. 1. The action, however, is the same, both as regards the one form-cylinder B and two impression cylinders, C $C^2$, printing on the one side of two independent webs, and three form-cylinders and four impression-cylinders doing the same work as four form-cylinders and a corresponding number of impression-cylinders. Applied to the surfaces of both the form and impression cylinders may be bands *s*, of leather, rubber, wood, or other comparatively yielding material, arranged around said cylinders and in contact with each other, whereby continuous contact is preserved between the form and impression cylinders throughout their entire revolution, thus doing away with "dragging" or "slurring," and counteracting the effect of backlash in the gearing by which said cylinders are connected or driven.

I claim—

The within-described system of form and impression cylinders or rollers, the same consisting of a combination of two pairs of cylinders or rollers, one pair of which is composed of one form cylinder, $B^1$, and an impression-cylinder, $C^1$, while the other pair is composed of one form-cylinder, $B^2$, and an impression-cylinder, $C^3$, and an interposed series of cylinders, consisting of two impression-cylinders, C $C^2$, and one intermediate form-cylinder, B, for operation on two independent webs, substantially as specified.

JOSEPH L. FIRM.

Witnesses:
HENRY T. BROWN,
BENJAMIN W. HOFFMAN.